United States Patent
Sianesi et al.

[15] 3,665,041
[45] May 23, 1972

[54] PERFLUORINATED POLYETHERS AND PROCESS FOR THEIR PREPARATION

[72] Inventors: Dario Sianesi, Milan; Renzo Fontanelli, Rome, both of Italy

[73] Assignee: Montecatini Edison S.p.A., Milan, Italy

[22] Filed: Apr. 2, 1968

[21] Appl. No.: 718,223

[30] Foreign Application Priority Data

Apr. 4, 1967 Italy..................................14508 A/67

[52] U.S. Cl. ..............................260/615 A, 252/54, 252/63, 252/65, 252/67, 252/364, 260/544 F, 260/594
[51] Int. Cl. ....................................................C07c 43/30
[58] Field of Search ......................260/615 A, 614 F, 615 BF

[56] References Cited

UNITED STATES PATENTS

| | | |
|---|---|---|
| 3,392,097 | 2/1968 | Gozzo et al.....................260/614 F X |
| 2,500,388 | 3/1950 | Simons..............................260/614 F |
| 3,214,478 | 10/1965 | Milian............................260/615 BF |
| 3,242,218 | 3/1966 | Miller............................260/614 F X |
| 3,342,875 | 9/1967 | Selman et al....................260/615 BF |
| 3,423,364 | 1/1969 | Kowanko.....................260/615 BF X |

OTHER PUBLICATIONS

Fukuhara et al., J. Am. Chem. Soc. 63 (1941) pp 788–791

*Primary Examiner*—Howard T. Mars
*Attorney*—Hubbell, Cohen & Stiefel

[57] ABSTRACT

New polyether oligomers, homopolymers and copolymers consisting only of carbon, fluorine and oxygen atoms, having only perfluoralkyl terminal groups, and containing no peroxidic oxygen. Prepared by reacting polyether which contains reactive terminal groups and, optionally, peroxidic oxygen with fluorine gas under pressures between about 0.2 and 10 atmospheres and at temperatures between about 100° and 350° C.

8 Claims, No Drawings

PERFLUORINATED POLYETHERS AND PROCESS FOR THEIR PREPARATION

BACKGROUND OF THE INVENTION

1. Field of the Invention

The present invention relates to new compounds and mixtures thereof having the structure of linear polyethers and copolyethers, which compounds consist only of carbon, fluorine and oxygen atoms and have perfluoroalkyl terminal groups at both ends of the chains. The invention also relates to a process for the preparation of these perfluorinated compounds and mixtures thereof.

2. Description of the Prior Art

In prior patent applications, including applications Ser. Nos. 650,257, filed June 30, 1967 and now abandoned; 652,000, filed July 10, 1967 and now abandoned; 654,364, filed July 19, 1967 and now abandoned; 651,128 filed July 5, 1967 now U.S. Pat. No. 3,513,203; 653,012, filed July 13, 1967 now U.S. Pat. No. 3,451,908; 655,665, filed July 24, 1967 now U.S. Pat. No. 3,564,059 and 702,533, filed Feb. 2, 1968, all of which are assigned to the assignee hereof, there have been described fluorinated polyethers and copolyethers, possibly containing also peroxidic bridges, having at the ends of their chains, reactive or hydrogen-containing terminal groups, such as e.g., $-COF$, $-CF_2-CO-CF_3$, $-CF_2H$, $CFH-CF_3$, etc., which render these products chemically active or limit their thermal stability.

SUMMARY OF THE INVENTION

It has now been found that it is possible to transform the foregoing products and mixtures of said products into products or mixtures of products having essentially the same structure but in the molecules of which the peroxidic oxygen is completely absent and the terminal groups of the chains consist only of perfluoroalkyl groups. These new products therefore have exceptional characteristics of chemical and thermal stability.

The products of the present invention are thus compounds, or mixtures thereof, having the structure of perfluorinated polyethers of homopolymeric or copolymeric nature, having the average formula $$X-O-(-C_3F_6-O-)_P-(CF_2-O)_Q-(-C_2F_4-O-)_R-Y$$

in which $-C_3F_6-$ and $-C_2F_4-$ are perfluoroalkylene groups having the structure

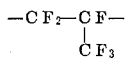

and $-CF_2-CF_2-$, respectively, and the three different perfluoroalkylene units are randomly distributed along the chain, R, Q and R are average indices of composition and only P and/or R can be zero, the sum P+Q+R has a value of between 2 and 200, the ratio P/(Q+R) has a value of from 0 to 50, the ratio R/Q has a value of from 0 to 10, X and Y are terminal groups selected from the group consisting of $-CF_3$, $-C_2F_5$, $C_3F_7$ and

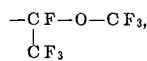

provided that both terminal groups X and Y are $-CF_3$ when both indices P and R are equal to zero, the terminal groups are the same or different from each other and are selected from the group consisting of $-CF_3$ and $-C_2F_5$ when only index P is zero, and when P is different from zero, the two terminal groups are the same or different from each other and selected from the group consisting of $-CF_3$, $-C_2F_5$ and $-C_3F_7$, or one of the terminal groups may be

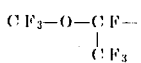

The polyethers, copolyethers and mixtures thereof of the present invention are synthesized in accordance with the present invention by reacting gaseous fluorine, either pure or diluted with an inert gas, with polyethers, copolyethers and mixtures thereof.

The starting polyethers have a chain structure essentially analogous to that of the products of the invention, but contain chain terminal groups at least in part of a different structure and, possibly combined oxygen atoms in the peroxidic form.

The present invention therefore also provides a process for the preparation of perfluorinated polyethers and copolyethers containing no peroxidic oxygen, and mixtures thereof, having the average formula $$X-O-(-C_3F_6-O-)_P-(-CF_2-O-)_Q-(-C_2F_4-O-)_R-Y$$

in which X, Y, P, Q and R are as defined above, by reacting gaseous fluorine, either pure or diluted with an inert gas up to a fluorine content of 10 percent by volume, under pressures between about 0.2 and 10 atm and at temperatures between about 100° and 350° C, with polyethers or mixtures thereof having the average general formula $$W-O-(-C_3F_6-O-)_S-(-CF_2-O-)_T-(-C_2F_4-O-)_U-(-O-)_V-Z$$

in which W and Z are terminal groups, one of which is selected from the group consisting of

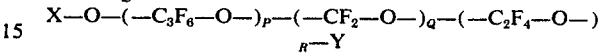

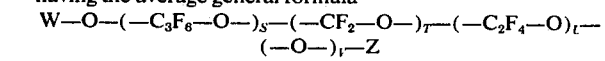

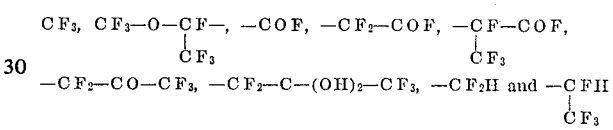

when the index S in other than zero, while when S is zero it is selected only from the group consisting of $-CF_3$, $-COF$, $-CF_2-COF$ and $-CF_2H$ and the other terminal group is selected from the group consisting of

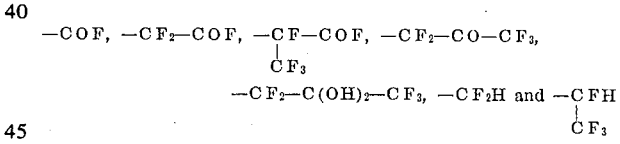

when the index S is other than zero, while when S is zero such other terminal group is selected only from the group consisting of $-COF$, $-CF_2-COF$ and $-CF_2H$; $(-O-)$ is an oxygen atom randomly distributed along the chain and linked in the peroxidic form to the different perfluorooxyalkylene units, S, T, U and V are average indices of composition, of which S, U and V can be zero; the sum S+T+U has a value between about 2 and 200 or more, the ratio S/T+U is between about 0 and 50, the ratio U/T is between about 0 and 10, the ratio V/S+T+b'z1 is between about 0 and 0.1 and index V is zero when S and U are zero, the value of average indices P, Q and R of the products of the reaction being equal to or up to 10 percent lower than those of indices S, T and U of the polyether starting materials.

DESCRIPTION OF THE PREFERRED EMBODIMENTS

A particular feature of the invention is that it provides mixtures of perfluorinated polyethers having a copolyether structure, in which indices P, Q and R are not necessarily integers since they represent average values.

When both indices P and R are zero, the polyethers of the present invention have the formula

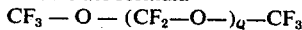

and can be defined as perfluoropolyoxymethylenes.

The copolyethers and their mixtures in which only index P is zero have the formula

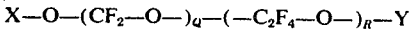

in which X and Y are $CF_3$ or $C_2F_5$.

The ratio between the number of —$C_2F_4O$— units and that of —$CF_2O$— units which can be simultaneously present in a molecule of copolyethers of this type varies in general between 0.001 and 10, preferably between 0.2 and 5.

When only index R is zero, the copolyethers and their mixtures contain only —$CF_2O$— units together with the —$C_3F_6O$— units. Their average structure is expressed by the formula $$X-O-(C_3F_6O)_P-(CF_2O)_q-Y$$

in which X and Y can be the same or different from each other and are selected from perfluoroalkyl groups containing 1 to 3 C atoms, or one of X and Y can also be $$CF_3-O-\underset{\underset{CF_3}{|}}{CF}-$$

In general, the preferred average ratio of indices Q/P is between about 1 and 0.02.

Copolyethers of the last two structures, i.e., those containing $C_1$ and $C_2$ units and, respectively, $C_3$ and $C_1$ units, and the respective mixtures thereof, represent a preferred object of the invention due to a favorable combination of properties which distinguish these products.

Products of this nature are characterized by very high chemical and thermal stability. Moreover, the presence of a —$CF_2$—O— unit causes, as compared with the homopolyethers of hexafluoropropylene, an increase in the ratio between the number of —C—O— bonds in the chain with respect to —C—C— bonds. As is known, this results in a lower rigidity in the molecular structure and therefore products are advantageously obtained which have a lower viscosity, the molecular weight being the same, and also a lower volatility, the viscosity being the same. Another advantage is a lower variation of the viscosity with temperature and a lower pour point of said products. It is well known, in fact, that while the —C—C— bonds have a remarkable energetic barrier which opposes their rotation, this cannot be said for —C—O— bonds and therefore a higher ratio of bonds —C—O—/—C—C— in the main chain causes the aforesaid effects.

A completely analogous effect can also be observed in the copolyethers on the basis of —$C_2F_4O$— and —$CF_2O$— units with respect to homopolyethers consisting only of —$C_2F_4O$— units.

As stated above, the variation of viscosity with temperature of the copolyethers and mixtures thereof having a reasonably narrow distribution of molecular weights is very small, which means that said copolyethers have a very high viscosity index. As is well known, this characteristic is desirable when fluids are used in systems involving drastic temperature variations.

Furthermore, the advantageous effect on the characteristics of the perfluorinated polyethers due to the presence in the chain of —$CF_2O$— units is evidenced by the fact that the copolyethers containing —$C_2F_4O$— and —$CF_2O$— repeating units in a ratio from 1:5 to 5:1 are liquid even at very low temperatures, they do not crystallize even at temperatures as low as −100° C, and, even more importantly, they do not exhibit a glass transition at very low temperatures, whereas homopolyethers having a $(C_2F_4O)_n$ structure and a relatively high molecular weight, for example those in which $n$ is higher than 100, are on the contrary crystalline products having a melting point of about 40° C. These crystalline products are obviously unsuitable to be used in the field of inert fluids since they are insoluble at room temperature. Finally, the presence of —$CF_2O$— units in the copolyether chain results in a remarkable improvement of the resistance to oxidation of these products, since the —$CF_2O$— units contain only —C—O— bonds and no —C—C— bonds at all, and only the latter bonds can be attacked by oxygen. Obviously, said three characteristics which are exhibited by the perfluorinated polyethers containing —$CF_2O$— units, i.e., a very high viscosity index, a very low pour point and a very high resistance to oxidizing agents, are enhanced as the percentage of said —$CF_2O$— units in the polyether chain increases and they are practically at their highest level when the polyether chain consists of only —$CF_2O$— repeating units.

However, since other advantageous properties such as a high resistance to solvents, hydrolyzing agents and to chemicals in general are imparted to the polyether chain by the presence therein of a rather high fluorine content, i.e., when there is a substantial content of —$C_3F_6O$— and/or —$C_2F_4O$— units in the chain, it has been found that the products having the most favorable combination of properties are those which contain simultaneously in the chain both —$CF_2O$— units and —$C_3F_6O$— and/or —$C_2F_4O$— units.

The process of the present invention is preferably carried out at temperatures between about 120° and 320° C and under substantially atmospheric pressure, using an inert gas such as nitrogen, helium or argon as a diluent for the fluorine.

The process of the present invention provides the following results:

1. elimination of oxygen bound in the peroxidic form, which may be present in the starting materials;
2. elimination of chemically reactive terminal groups of acidic nature, such as —COF, —COOH, ketone or hydrated ketone groups;
3. transformation of neutral terminal groups containing hydrogen such as —$CF_2H$ and —CFH—$CH_3$ groups, into perfluorinated terminal groups.

All these transformations lead to the over-all result of imparting to the products of the invention very high thermal stability and chemical inertia characteristics, coupled with very good dielectric and lubricating properties.

The perfluorinated polyether products of the invention are in the form of colorless liquids whose boiling temperature, density and viscosity increase with increasing average molecular weight. In general, their boiling temperature is between about 50° C and more than 350° C at 0.1 mmHg.

The mixed polyethers of the present invention have various useful applications. In the form of relatively low-boiling distillation cuts, they can be used as solvents, dielectric media, hydraulic fluids and inert liquids for heat transfer. Fractions of mixtures of products having a higher molecular weight are particularly suitable as lubricants at high temperatures for use in contact with reactive materials, and as plasticizers, dielectric oils, etc.

Generally the starting polyether material which is subjected to reaction with fluorine is in the liquid state at the reaction temperature and can be used as is, without any dilution.

In carrying out the reaction of the invention, the simplest technique consists of passing a gaseous current of fluorine, either pure or diluted with an inert gas, into a liquid polyether reactant maintained at the selected reaction temperature, preferably taking care to obtain good contact between the gaseous phase and the reactant liquid phase by any known technique.

The reaction is continued until there is a complete transformation of the original terminal groups into perfluoroalkyl groups and a complete disappearance of the peroxidic groups, if any, in all or most of the starting polyether material.

The fluorination reaction can be carried out as a continuous process by feeding a liquid phase of polyether to a reactor through which a gaseous fluorine current is passed. In this case, in order to assure good contact between the reactants, the reactor will preferably contain a filling of an inert contact promoting material, such as Monel, nickel, platinum, etc., which is completely inert in the fluorination reaction and does not exert any catalytic activity.

In this fluorination stage various reactions occur in the terminal groups. Some of these reactions are represented in the following equations, in which the symbol $P_f$ has been adopted to show a chain of perfluorinated polyether or copolyether of any length.

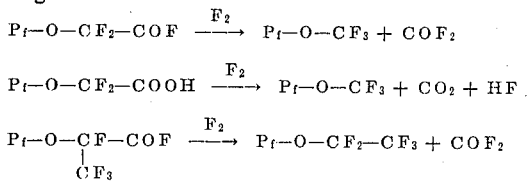

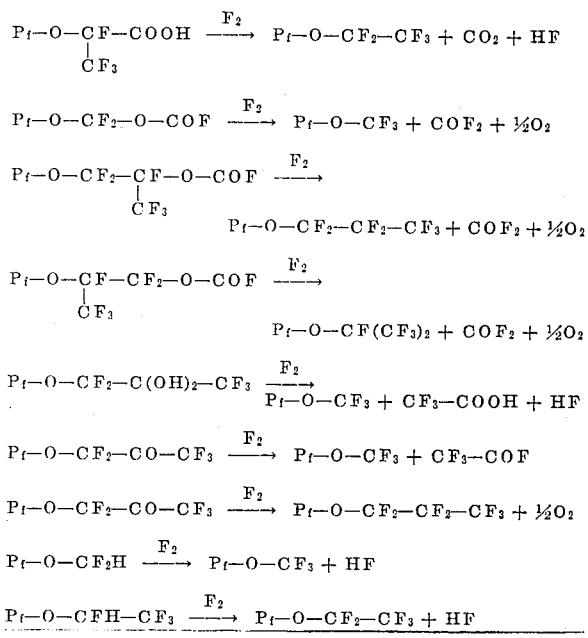

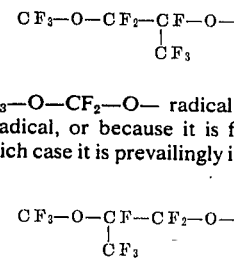

Besides reactions of this type, which relate exclusively to the terminal groups of the molecules, fluorine at high temperatures can also react with inner bonds of the polyether chains.

However, as will be observed, the fluorination reaction carried out under the aforementioned conditions is highly specific for the chain terminal groups, and the extent of the reactions causing breaking of inner bonds of the molecules, or also separation of the side $-CF_3$ group, can be restricted to a negligible degree. In practice, through the reaction in question, there are obtained perfluorinated polyethers and copolyethers containing only perfluoroalkyl terminal groups which have practically the same or only a slightly lower molecular weight as compared to that of the starting polyether. Moreover, it can also be ascertained that the preceding observation is valid even when the starting polyether contains some oxygen combined in the peroxidic form, e.g., up to one atom of peroxide oxygen per 10 atoms of ether oxygen present in the chain, and after the treatment with fluorine the polyether does not contain any trace of such peroxidic groups. The fluorination does not cause significant modifications of the mutual ratios between the different fluorinated units forming the polyether chains. In other words, with reference to the general formulae given above, the values of indices P, Q and R relating to the molecules of the polyethers and copolyethers after fluorination are practically the same as, or only up to 10 percent lower than, the values of the corresponding indices S, T and U of the starting polyethers, while index V has the value of zero in the final products.

This fact is in certain aspects surprising, due to the high reaction temperature and to the well known chemical reactivity of fluorine towards, e.g., the carbon-to-carbon bonds, which in general render its reactions scarcely specific.

Accordingly, the action of fluorine at high temperatures in the process of the present invention transforms the original terminal groups into perfluoroalkyl radicals; and the products obtained, either in the form of pure chemical compounds or in the form of mixtures thereof, are always perfluorinated polyethers or copolyethers of linear structure, having at the ends of the chain, perfluoroalkyl terminal groups bound to an atom of ether oxygen and containing one to three carbon atoms. In general, however, it has been observed that in the products, the trifluoromethoxy terminal group, $-O-CF_3$, is prevailing either because it is normally already present in the products subjected to fluorination, in which case it is prevailingly in the form of the $$CF_3-O-CF_2-CF-O-$$
$$\qquad\qquad\qquad\;\; |$$
$$\qquad\qquad\qquad\; CF_3$$

radical or the $CF_3-O-CF_2-O-$ radical or the $CF_3-O-CF_2-CF_2-O-$ radical, or because it is formed during the fluorination, in which case it is prevailingly in the form of the $$CF_3-O-CF-CF_2-O-$$
$$\qquad\qquad\;\; |$$
$$\qquad\qquad CF_3$$

if $-C_3F_6O-$ units were present in the starting material.

The fluorination process of the invention is preferably applied to mixtures of compounds and therefore yields mixtures of perfluorinated polyethers and copolyethers. From these mixtures it is possible to separate by physical means, such as fractional distillation or gas-chromatography, pure chemical products, that is products characterized by a precise chemical formula. However, for many of the possible uses of these products, such separation is not necessary and the products of the invention can be used in the form of mixtures of compounds, optionally after simple treatments, such as distillation, to give a separation of cuts or fractions having the desired average characteristics. In these mixtures there can obviously be present compounds which differ from each other in the value of indices P, Q and R and in the structure of groups X and Y. Moreover, when one or both indices P and R are not zero, the various compounds can differ from each other, the above-mentioned indices being the same, in having a different distribution of the perfluoroalkylene units along the chain. In general the mixtures of polyethers and copolyethers of the invention can be characterized on the basis of average values of indices P, Q and R and of the presence of the different chain terminal groups in certain mutual ratios.

The elements for a structural characterization of this type can be obtained from a combination of analytical (molecular weight, elemental composition) and spectroscopic (nuclear magnetic resonance spectrum, infrared spectrum) data.

Some spectroscopic data which are useful for the determination of the structure of polyethers, copolyethers and mixtures thereof, of the type herein described, are set forth below. These data relate to absorptions in the I.R. spectrum and to resonance bands in the nuclear magnetic resonance spectrum which it is believed can be associated with the presence of given chain terminal groups and of given structural units of the same chains. For instance, in the I.R. (infrared) absorption spectrum, the following relationships can be considered:

| Terminal group | Associated I.R. absorption |
|---|---|
| $-CF_2-COF$ | 1.884 cm.$^{-1}$ |
| $-CF-COF$ <br> $\;\;\;\;\;\|$ <br> $\;\;CF_3$ | 1.876 cm.$^{-1}$ |
| $-CF-CF_2-O-COF$ <br> $\;\;\;\;\|$ <br> $\;CF_3$ | 1.894 cm.$^{-1}$ |
| $-CF_2-CF-O-COF$ <br> $\qquad\;\;\|$ <br> $\quad\;\; CF_3$ | |
| $-COOH$ | 1.778 cm.$^{-1}$ |
| $-CF_2-CO-CF_3$ | 1.803 cm.$^{-1}$ |
| $-CF_2-C(OH)_2-CF_3$ | 3.612 cm.$^{-1}$ |
| $-O-CF_2H$ | 3.400 cm.$^{-1}$ |
| $-O-CFH-CF_3$ | 3.000 cm.$^{-1}$ |

In the resonance spectrum of fluorine, the resonances in the listed zones have been associated by us with fluorine atoms belonging to the corresponding groups listed in the last column.

| P.p.m. (from CFCl3) | Number of fluorine atoms | Group or function |
|---|---|---|
| +80 | 5 | —O—CF$_2$—CF—O—<br>                        \|<br>                        CF$_3$ |
| +49 to +51. | 2 | —O—CF$_2$—O— |
| +99 | 1 | CF$_3$—O—CF—O—<br>                        \|<br>                      CF$_3$ |
| +54 | 2n (n≥2) | —(CF$_2$—O)$_n$— |
| +56 | 3 | CF$_3$—O—CF$_2$—CF—O—<br>                                    \|<br>                                    CF$_3$ |
| +54 | 3 | CF$_3$—O—CF—CF$_2$—O—<br>                          \|<br>                        CF$_3$ |
| +58 | 3 | CF$_3$—O—CF$_2$O— |
| +51.9 | 2 | —O—CF$_2$—CF$_2$—O—CF$_2$—O—CF$_2$—CF$_2$—O— |
| +53.6 | 2 | —O—CF$_2$—O—CF$_2$—O—CF$_2$—CF$_2$—O— |
| +55 | 3 | CF$_3$—O—CF—O—<br>                      \|<br>                      CF$_3$ |
| +59 | 2 | —CF$_2$—O—CF$_2$—COF |
| +82 | 3 | CF$_3$—CF$_2$—CF$_2$—O— |
| +130 | 2 | CF$_3$—CF$_2$—CF$_2$—O— |
| +81.5 | 2 | CF$_3$—CF$_2$—CF$_2$—O— |
| +11.6 | 1 | FOC—O—CF—CF$_2$—O—<br>                          \|<br>                        CF$_3$ |
| +12.3 | 1 | FOC—O—CF$_2$—CF—O—<br>                              \|<br>                            CF$_3$ |
| +15.1 | 1 | FOC—O—CF$_2$—O— |
| −12.5 to −13 | 1 | FOC—CF$_2$—O— |
| −26.4 | 1 | FOC—CF—O—<br>                \|<br>                CF$_3$ |
| +75.7 | 2 | —CF—O—CF$_2$—COOH<br>      \|<br>      CF$_3$ |
| +83.2 | 2 | CF$_2$H—O— |
| +84.7 | 3 | CF$_3$—CFH—O— |
| +144.5 | 1 | CF$_3$—CFH—O— |
| +79 | 2 | —O—CF$_2$—O—CF$_2$—COF |
| +80 | 2 | —O—CF$_2$—O—CF$_2$—COOH |
| +142 | 1 | CF$_2$H—O—CF—CF$_2$—O—<br>                      \|<br>                      CF$_3$ |
| +74.8 | 3 | CF$_3$—CO—CF$_2$—O— |
| +82.8 | 3 | CF$_3$—C(OH)$_2$—CF$_2$—O— |
| +87.6 | 3 | CF$_3$—CF$_2$—O—CF$_2$— |
| +89.3 | 4 | (CF$_2$—CF$_2$—O)$_n$ ≥3 |

Moreover, in the resonance spectrum of the hydrogen atom, the resonances in the zones of 6.3 and 5.75 p.p.m. (from tetramethylsilane) have been associated by us with the presence of terminal groups —OCF$_2$H and —O—CFH—CF$_3$, respectively.

For a further discussion of the foregoing types of analyses, reference may be had to application Ser. No. 650,257, filed June 30, 1967.

EXAMPLE 1

The starting polyether compounds containing acid terminal groups were obtained by the following process: 1,040 g of C$_3$F$_6$, kept in the liquid state at a temperature of −60° to −55° C in a cylindrical stainless steel vessel having a volume of 1.3 liters and an inner diameter of 70 mm, were irradiated for 2 hours with an ultraviolet-ray lamp (Hanau TQ 81 type — 3.8 watts of a wave-length emission of 2,000–3,000 A) contained in a quartz sheath having an outer diameter of 20 mm and placed axially in the middle of the reactor. During this period a stream of 40 l/h of oxygen was passed through the liquid phase of C$_3$F$_6$ under atmospheric pressure, which stream of oxygen was cooled at the outlet in a reflux condenser to −80° C.

At the end of the reaction the excess C$_3$F$_6$ and the volatile reaction products were removed by heating to 80° C under vacuum (10 mmHg). Ninety-four g of residue were thus obtained in the form of a colorless viscous liquid having an average molecular weight of about 6,000 and an elemental composition corresponding to the formula CF$_{1.98}$O$_{0.36}$. The active oxygen content (iodometric method) corresponded to 0.47 g of active O$_2$/100 g of product. On the basis of these data and of the NMR spectroscopic analysis the average chemical structure appeared to be expressed by the formula $$WO—(C_3F_6O)_S—(CF_2O)_T(O)_V—Z$$

in which W is prevailingly —CF$_3$, although small amounts of $$CF_3—O—CF—$$
$$\quad\quad\quad\quad\quad\quad|$$
$$\quad\quad\quad\quad\quad\quad CF_3$$

are also present $$(—CF_3/—CF—O—CF_3$$
$$\quad\quad\quad\quad\quad|$$
$$\quad\quad\quad\quad\quad CF_3$$

ratio of about 20:1). $T/S = 0.02$, $V/(S+T+1) = 0.05$, and Z prevailingly consists of the —COF group present in the two structures $$—CF_2—CF—OCOF$$
$$\quad\quad\quad\quad|$$
$$\quad\quad\quad\quad CF_3$$

and $$CF—CF_2—OCOF$$
$$|$$
$$CF_3$$

in a ratio of 3:1.

Small amounts of terminal groups —CF$_2$—O—COF, $$—CF—COF$$
$$|$$
$$CF_3$$

and CF$_2$—COF are also present.

Fifty g of this copolyether were introduced into a small Monel reactor having a capacity of 75 cc, provided with a dipping tube and with a reflux condenser, into which a current of 10 l/h of fluorine diluted with 40 l/h of nitrogen was bubbled. The reaction was begun at room temperature and then gradually heated up to 250° C within a period of about 2 hours. The reaction was continued at this temperature (250° C) for 10 hours.

At the end of the reaction 40 g of a perfluorinated product were obtained, which product had a molecular weight of about 5,500 and an elemental composition corresponding to the formula CF$_2$O$_{0.34}$ and did not contain either active oxygen or acid functions.

The spectroscopic examination showed that the ratio of units C$_3$F$_6$O/CF$_2$O was practically unaltered with respect to that of the starting product and that the terminal groups were mainly of the two types $$CF_3O—CF_2—CF—$$
$$\quad\quad\quad\quad\quad|$$
$$\quad\quad\quad\quad\quad CF_3$$

(already present in the starting product) and $$CF_3—O—CF—CF_2—.$$
$$\quad\quad\quad\quad|$$
$$\quad\quad\quad\quad CF_3$$

Minor amounts of perfluoroalkoxy groups, prevailingly CF$_3$—CF$_2$—CF$_2$—O— and CF$_3$—CF$_2$—O—, were also present in addition to the terminal groups $$CF_3—O—CF—O—$$
$$\quad\quad\quad\quad|$$
$$\quad\quad\quad\quad CF_3$$

present in the starting material.

The reaction product was in the form of a colorless transparent liquid having a viscosity of 430 cs (centistokes) at 20° C, a density of 1.889 (g/ml) at 25° C and a viscosity index (ASTM 2270/64) of 123.

By fractional distillation under high vacuum, this product was divided into 3 fractions, the first of which, 15 percent by weight of the total, had a distillation temperature up to 200° C/0.1 mmHg with a viscosity of 35 cs at 20° C and a density of 1.86 at 25° C; the second fraction, 25 percent by weight of the total, had a distillation range from 200 to 290° C/0.1 mmHg, a viscosity of 250 cs at 20° C and a density of 1.892 at 25° C; the third fraction, having a distillation temperature higher than 290° C/0.1 mmHg, had a viscosity of 1,700 cs at 20° C and a density of 1.905 at 23° C.

The viscosity data of said three fractions at temperatures of 100° F, 210° F, the corresponding viscosity index (ASTM 2270/64) and the pour point (ASTM D—97/57) were as follows:

|  | Kinematic viscosity at 100°F. (cs) | viscosity at 210°F. (cs) | Viscosity Index | Pour Point |
|---|---|---|---|---|
| I fraction | 16 | 3.2 | 52 | −70°C. |
| II fraction | 85 | 11.0 | 106 | −37°C. |
| III fraction | 520 | 42.0 | 134 | −26°C. |

EXAMPLE 2

One hundred g of the copolyether obtained by reaction of $C_3F_6$ and $O_2$ as described in Example 1, were heated at a temperature of 250° C for 10 hours and the gaseous and volatile liquid products thus formed were removed. This treatment eliminated all peroxidic oxygen as $CF_3$—$COF$ + $COF_2$ and furthermore transformed the terminal groups according to the reactions:

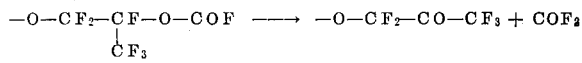

At the end of the reaction, 87 g of a product which contains neither peroxidic oxygen nor terminals of the fluoroformate type —O—COF were obtained. The molecular weight determinations and the spectroscopic analysis showed that it could be assigned the prevailing formula $$CF_3O-(C_3F_6O)_S - (CF_2O)_T-CF_2-CO-CF_3$$

with a T/S ratio = 0.02 and an average molecular weight of about 7,000.

Fifty g of this product were treated in the Monel reactor apparatus described in Example 1, with a current of 20 l/h of fluorine diluted with 20 l/h of nitrogen at 250° C for 10 hours. At the end of the reaction, 48 g of a perfluorinated product having a structure analogous to that of the starting product except for the ketone terminal groups, which appeared to be transformed into perfluoroalkoxy terminal groups $CF_3O-$ and $CF_3-CF_2-CF_2-O-$ in the ratio of about 2:1, were obtained.

An analogous experiment was carried out by starting from 40 g of the same polyethers with ketone terminals, but to which was previously added at room temperature, 2 percent by weight of water, after having stirred for 30 minutes at room temperature, so as to transform the ketone groups into hydrated ketogroups of the type $-CF_2-C(OH)_2-CF_3$. Thirty-seven g of perfluorinated copolyethers having the same characteristics as the preceding products were obtained after reaction with fluorine.

EXAMPLE 3

One hundred g of the polyether product obtained by combination of $C_3F_6$ and $O_2$ as described in Example 1, were treated with 10 g of 85 percent KOH while agitating for 3 hours at 150° C and 5 hours at 250° C in order to cause salt formation and decarboxylation reactions.

At the end of the foregoing treatment, the liquid product (85 g) was filtered from the residual salts and analyzed. It was found to consist of a mixture of products having the average formula:

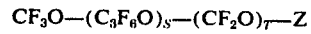

in which: T/S = 0.03 and Z consists of $-CF_2H$ and $-CFH-CF_3$ terminal groups in a ratio of 4:1. The average molecular weight was about 5,500.

Fifty g of this product were treated in the Monel reactor described in Example 1 with a stream of 20 l/h of pure fluorine at 150° C for 10 hours. Forty-nine g of perfluorinated copolyethers having practically the same structure as the starting products, but in which the hydrogenated terminal groups were replaced by perfluoroalkyl groups $-CF_3$, $-C_2F_5$ (and $C_3F_7-$ to a lower extent), were obtained.

Comparative tests of stability to oxygen at temperatures of 250°–350° C showed that this perfluorinated copolyether is remarkably more stable than the starting copolyether containing hydrogenated terminal groups. The thermogravimetric tests carried out on the starting material and on the obtained product at a heating rate of 5° C per minute, showed that the hydrogen-containing product had a weight loss of 5 percent in the oxygen atmosphere at temperature of 365° C whereas the perfluorinated product had a loss of 1 percent under the same conditions.

EXAMPLE 4

The same reaction of photochemical oxidation of liquid $C_3F_6$ was carried out at a temperature of +22° to +24° C and under a pressure of 7 atm. After evaporation of unreacted $C_3F_6$ and of the volatile products at 80° C, 135 g of residual polyether products were obtained. These products had an elemental composition corresponding to the formula, $CF_{1.95}O_{.58}$, with an active oxygen content of 0.8 g/100 g of product and with a molecular weight of about 1,000.

From the spectroscopic examination it appeared that the products could be represented by the general formula:

in which T/S = 0.72, V/(S+T+b1) = 0.08, W consists of $CF_3O-$ and

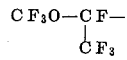

in the ratio of 5:1, and Z has the prevailing structures —COF, $-CF_2COF$, and

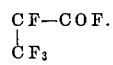

Fifty g of this product were reacted as described in Example 1 with a current of 20 l/h of fluorine diluted with 40 l/h of nitrogen, by gradually heating up to 250° C and then maintaining this temperature for 10 hours.

At the end of the reaction, 40 g of polyether products were obtained which products, by spectroscopic analysis, appeared to have only perfluoroalkoxy terminal groups with an average molecular weight of about 1,000 and with a practically unaltered ratio between the different perfluoroalkylene units but without peroxidic groups.

This product can therefore be defined by the formula

in which X and Y are selected from $-CF_3$, $-C_2F_5$, $-C_3F_7$,

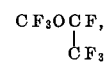

with a prevalence of $-CF_3$ and $-C_3F_7$, R = 0, the ratio Q/P = 0.7 and the sum of P+Q is of the order of 7.

EXAMPLE 5

The reaction of photochemical oxidation of liquid $C_3F_6$ was carried out at a temperature of −30° to −25° C under a pressure of 2 atm. After removal of unreacted $C_3F_6$ and of the volatile products at 50° C and 10 mmHg, 260 g of copolyether products were obtained. These products had an elemental analysis corresponding to the formula $CF_{1.97}O_{0.39}$, an average molecular weight of about 4,000 and an active oxygen content of 0.8 g/100 of product.

The spectroscopic determinations agreed with a prevailing average formula $$CF_3O-(C_3F_6O)_S-(CF_2O)_T-(O)_V-COF$$

in which: T/S = 0.05, V/(S+T+b1) = 0.08 and the terminal group —COF is present prevailingly in the two fluoro-formate groups $$-CF_2-CF-O-COF \text{ and } -CF-CF_2-OCOF$$
$$\phantom{-CF_2-}|\phantom{CF-O-COF and } \phantom{-}|$$
$$\phantom{-CF_2-}CF_3 \phantom{CF-O-COF and -CF-}CF_3$$

in the ratio of 4:1.

Minor amounts of terminal groups $$CF_3-O-CF-$$
$$\phantom{CF_3-O-}|$$
$$\phantom{CF_3-O-}CF_3$$

and —$CF_2$—O—COF are also present.

Five hundred g of copolyethers obtained by the foregoing reaction ere heated for 4 hours to 250° C so as to eliminate the peroxidic oxygen and to transform the fluoroformate groups into terminal groups —$CF_2$—CO—$CF_3$ and $$-CF-COF$$
$$\phantom{-}|$$
$$\phantom{-}CF_3$$

in the ratio of 4:1.

The residual product was treated with 45 g of 85 percent KOH for a period of 5 hours at 250° C until the evolution of gas ($CHF_3$ and $CO_2$) ceased. By filtration, a neutral liquid copolyether (420 g) was obtained in which terminal groups —$CF_3O$, —$CF_2H$ and —$CFHCF_3$ were present, the last two in the ratio of 4:1, while the two perfluorooxyalkylene units in the chains were present in a ratio equivalent to those of the raw acid product.

Four hundred g of this neutral copolyether were subjected to fractional distillation under a vacuum of 0.1 mmHg and divided into 6 fractions as set forth in Table I below.

Forty g of each of these fractions were treated with a current of 20 l/h of pure fluorine at 150° C for 6 hours.

After this treatment spectroscopic analysis showed the absence of hydrogen and the presence of perfluoroalkyl terminal groups prevailingly consisting of $CF_3$—, of the two types $$CF_3-O-CF-CF_2- \text{ and } CF_3O-CF_2CF-,$$
$$\phantom{CF_3-O-}|\phantom{CF-CF_2- and CF_3O-CF_2}|$$
$$\phantom{CF_3-O-}CF_3 \phantom{CF-CF_2- and CF_3O-CF_2C}CF_3$$

and also —$C_2F_5$ and —$C_3F_7$.

The ratio between the units $C_3F_6O$ and $CF_2O$ in the chain was unaltered after the fluorination. The characteristics of the various fractions before and after the treatment with fluorine are reported in Table I.

TABLE I
[Physical properties of neutral copolyethers before and after treatment with fluorine]

| Fraction number | Distillation range under 0.1 mm. Hg, ° C. | Viscosity, 20°(cts.) | | $d_{25}$ (g./ml.) | | M.W. | |
|---|---|---|---|---|---|---|---|
| | | Before | After | Before | After | Before | After |
| 1 | 50–100 | 7.36 | 7.70 | 1.823 | 1.823 | 1,000 | 1,140 |
| 2 | 100–150 | 26.24 | 26.07 | 1.856 | 1.870 | 1,720 | 1,730 |
| 3 | 150–200 | 78.47 | 77.45 | 1.875 | 1.879 | 2,700 | 2,680 |
| 4 | 200–250 | 152.32 | 150.10 | 1.883 | 1.885 | 3,600 | 3,500 |
| 5 | 250–300 | 279.50 | 239.06 | 1.889 | 1.890 | 4,600 | 4,350 |
| 6 | >300 | 823.90 | 786.76 | 1.900 | 1.901 | 7,100 | 6,750 |

EXAMPLE 6

The preparation of the starting polyether was carried out as follows: Into a glass reactor having a cylindrical shape and a capacity of 800 cc, containing 500 cc of $CF_2Cl$—$CFCl_2$ cooled to −10° C and irradiated with a U.V. lamp of the Hanau TQ 81 type, immersed in the liquid phase, a stream consisting of 20 l/h of $C_2F_4$ and 40 l/h of oxygen was bubbled for a period of 3 hours. The feeding of the reacting gases was then stopped and the irradiation of the liquid phase was carried on for an additional 12 hours. At the end of the reaction, and after evaporation of the solvent, 19 g of a high boiling liquid product having an elemental composition corresponding to the formula $CF_2O_{0.77}$ and containing 0.4 g of peroxidic oxygen per 100 g of product were obtained.

This polyether was heated for 3 hours at a temperature of 220° C, obtaining a residue of 15.5 g which, upon being subjected to distillation, gave 10 g of a fraction having a boiling temperature between 150° and 300° C at a pressure of 1 mmHg.

For this fraction an active oxygen content of 0.02 g per 100 g of product and an empirical formula $CF_2O_{0.79}$ was determined. Only chain terminal groups $CF_3O$— and —$CF_2$—COF appeared to be present, in a ratio of 1:1. The molecular structure consisted of —$CF_2O$— units and —$CF_2$—$CF_2$—O— units in a ratio of 4:1.

In a glass vessel having a capacity of 10 cc, provided with a dipping tube and with a reflux condenser with water circulation, 5 g of the previously described product were subjected to a treatment with pure gaseous fluorine for a period of 6 hours at a temperature of 200° C.

3.2 g of a neutral liquid product having the formula $CF_2O_{0.76}$ were obtained in which the ratio between the two units — $CF_2O$— and —$C_2F_4O$— forming the chains remained practically unaltered with respect to that of the starting product while the chain terminal groups appeared to consist prevailingly of $CF_3$— with very small amounts of —$C_2F_5$.

The product thus obtained had a structure that can be expressed by the formula $$X-O-(CF_2O)_Q-(C_2F_4O)_R-Y$$

in which X and Y are —$CF_3$ and —$C_2F_5$ in ratios of about 10:1; the ratio R/Q is 0.25.

EXAMPLE 7

Five hundred cc of $CF_2Cl$—$CFCl_2$ cooled to −5° C were introduced into the same reactor as used in Example 6, and the irradiation of the liquid phase was started while a gaseous mixture of 70 l/h containing $C_2F_4$, $C_3F_6$, $O_2$ in the ratios of 1:1:1.5 was bubbled through the liquid phase.

After 4 hours, the feeding of gas was stopped, and the irradiation of the liquid phase was continued for more than 15 hours.

Thereafter, the solvent was evaporated and 41 g of a liquid product having an elemental composition corresponding to the formula $CF_2O_{0.59}$ and containing 0.12 g of peroxidic oxygen per 100 g of product were obtained.

Spectroscopic examination showed that the product consists of linear chains containing units —$CF_2O$—, —$CF_2$—$CF_2$—O— and —$C_3F_6O$— in a ratio of 2:1:3 with neutral terminal groups —$CF_3$ and $CF_3$—O—$CF(CF_3)$— and terminal groups of acid nature having the structure —$CF_2$—O—COF, —$CF(CF_3)$—$CF_2OCOF$, —$CF_2$—$CF(CF_3)$—OCOF, —$CF_2$—COF.

This polyether was distilled and 15 g of a fraction having a boiling temperature between 150° and 220° C at 1 mmHg were separated.

A sample of 5 g of this product was subjected, modalities as described in Example 6, to treatment with fluorine at a temperature of 250° C for 10 hours.

3.8 g of a neutral polyether were obtained in whose molecular chains the units —$CF_2O$—, —$C_2F_4O$—, and —$C_3F_6O$— are contemporaneously present in an average ratio of 2:1:3 with chain terminal groups consisting only of neutral, saturated perfluorinated groups.

EXAMPLE 8

A photochemical oxidation reaction of perfluoropropylene was carried out in the gaseous phase in a spherical glass vessel having a capacity of 5 liters, provided with a quartz sheath containing a Hanau TQ 81 U.V. lamp cooled with an outer circulation of water.

A stream of 40 l/h of an equimolar mixture of $C_3F_6$ and $O_2$ was fed to the reactor. At the outlet from the reactor the high boiling products formed were separated while cooling. The reaction was continued until 100 g of products were obtained, which products were liquid at room temperature and were found to have an elemental composition very near the formula $CF_2O$, and which consisted, in a ratio of 2:1, of the oligomers of the two series: $CF_3O(CF_2O)_n$—COF and $CF_3O(CF_2O)_n$——$CF_2COF$ wherein $n$ is between 2 and 15.

A sample of 30 g of this mixture of compounds was kept in a glass vessel under reflux at atmospheric pressure for 24 hours, at initial boiling temperatures of about 100° C and final boiling temperatures of about 150° C. During this treatment a great amount of $CF_2O$ gas was eliminated and at the end, 12 g of a mixture of polyethers consisting almost completely of the oligomers of the series $CF_3$—$O(CF_2O)_n$—$CF_2$—COF, wherein $n$ is between 2 and 15, were obtained.

A sample of 10 g of these polyethers was treated, in the apparatus described above, with a stream of gaseous fluorine at a temperature of 120° C for 4 hours.

Six g of a mixture of neutral polyethers consisting of the oligomers $CF_3O(CF_2O)_n$—$CF_3$, wherein $n$ is between 2 and 10 were thus obtained.

EXAMPLE 9

The preparation of the sample was carried out as follows: Into a 600 cc cylinder glass reactor, provided with a quartz sheath, a dipping tube and a reflux condenser kept at −75° C, 500 g of liquid $CF_2Cl_2$ at −50° C were introduced and then a gaseous stream consisting of 30 l/h oxygen and 25 l/h of tetrafluoroethylene was fed through the dipping tube while irradiating with a U.V. lamp of the Hanau Q. 81 type immersed in the liquid phase. By means of an external cooling bath the temperature of −50° C was maintained during the entire run. After 2 hours of irradiation, the solvent was removed by distillation up to 50° C under atmospheric pressure and a residue consisting of 67 g of a liquid polymeric product which, by elemental analysis, had a composition of 62.0% of F and 19.60% of C, corresponding to the formula $CF_2O_{0.70}$, and an active oxygen content of 3.10 g per 100 g of product, was recovered.

This product was further irradiated at room temperature for 40 hours under a slow $N_2$ flow and then heated to a temperature of 250° C, which temperature was maintained for 4 hours. At the end of this treatment there remained 48 g of an oily polyether product containing one peroxidic oxygen atom per 25 ether oxygen atoms, which by N.M.R. examination proved to consist of chains containing the —$CF_2O$— and —$C_2F_4O$— units in the ratio of 1:1.3, with terminal groups consisting of $CF_3O$— and —$CF_2$—COF groups in practically equal amounts.

A sample of 96 g of the foregoing product was subjected to fluorination in a 150 cc glass flask by initially feeding a 20 l/h flow of fluorine diluted with 20 l/h of nitrogen at a temperature of 250° C for 15 hours and then continuing for an additional 5 hours at the same temperature feeding 15 l/h of pure fluorine. Thereafter, 87 g of a perfectly neutral oil which did not contain any trace of peroxidic groups and had a viscosity of 367 cs at 20° C, were recovered.

By subjecting this product to distillation under a vacuum of 0.2 mmHg, the following fractions were obtained:
Fraction I: b.p. 25°–200°C; 8.7 g; viscosity = 8.46 cs at 20° C.
Fraction II: b.p. 200°–270° C; 6.3 g; viscosity = 29.5 cs at 20° C.
Residue: 72 g; viscosity = 604 cs at 20° C, average molecular weight: > 10,000.

The viscosity data of said two fractions and of the residue at the temperatures of 100° F, 210° F, the corresponding viscosity index and the pour point were as follows:

|  | Kinematic viscosity at 100°F. (cs) | viscosity at 210°F. (cs) | Viscosity Index | Pour Point |
|---|---|---|---|---|
| fraction I | 5.6 | 2.1 | 270 | about −100°C. |
| fraction II | 18 | 5.6 | 300 | about −100°C. |
| residue | 345 | 92.7 | 342 | about −70°C. |

From spectroscopic N.M.R. examination, the compound appeared to contain only terminal groups of the two types $CF_3O$—$CF_2$—O— and $CF_3O$—$C_2F_4O$—, with a ratio between the —$CF_2O$— and —$C_2F_4O$— units of 1:1.32.

EXAMPLE 10

In the reactor described in the preceding example, 700 g of hexafluoropropylene were condensed at a temperature of −40° C. The U.V. lamp was then switched on and a gaseous flow consisting of 40 l/h of oxygen and 2 l/h of tetrafluoroethylene was fed through the dipping tube, keeping the reactor at a constant temperature of −35° C by means of an external cooling bath. After 4 hours of irradiation, the excess perfluoropropylene was evaporated under vacuum and 290 g of a polyether oil, which by iodometric analysis appeared to contain 0.56 g of active oxygen per 100 g of product, were obtained. From N.M.R. examination the polyether appeared to consist of —$C_2F_4$— and —$C_3F_6$— units in the ratio of 0.26. —$CF_2$— units were also found to be present in such lower proportions that the $CF_2/(C_3F_6 + C_2F_4)$ molar ratio was of the order of 0.02.

The chain terminal groups were of the $CF_3O$— and —COF type, in practically equal amounts.

This product was then irradiated with the same U.V. lamps at room temperature under a slow nitrogen flow for 30 hours.

At the end of the reaction, 275 g of a polyether having an active oxygen content of 0.05 g per 100 g of product were obtained.

This polyether was further heated in a glass flask at 250° C for 3 hours during which it lost 4 percent of its weight in the form of gaseous products ($COF_2$) and the peroxidic oxygen content was further reduced to 0.01 g/100 g of product.

The ratio between the —$C_2F_4O$— and —$C_3F_6O$— units of the thus treated polyether was 0.25. The terminal groups consisted of $CF_3O$— groups of the two types $CF_3$—O—$CF_2$—$CF(CF_3)$— and $CF_3$—O—$CF_2$—$CF_2$—, acylfluoride groups —O—$CF_2$—COF and —$CF(CF_3)$—COF, and ketone groups —$CF_2$—CO—$CF_3$.

One hundred eighteen g of this product were subjected to fluorination in a 200 cc glass flask by introducing a flow of 20 l/h of pure fluorine at 250° C for 16 hours. At the end of the treatment, 101 g of a neutral oil having a viscosity of 119 cs at 20° C were obtained. From spectroscopic N.M.R. examination, it appeared to contain terminal groups of the $CF_3$—O—$CF_2$—$CF(CF_3)$—, $CF_3$—O—$CF(CF_3)$—$CF_2$—, $CF_3$—O—$CF_2$—$CF_2$— (and $C_3F_7$— to a lower extent) type. The $C_2F_4O/C_3F_6O/CF_2O$ ratio was about 1:5:1. It did not contain any more traces of oxygen bound in the peroxidic form.

By subjecting it to distillation under a vacuum of 0.2 mmHg, the following fractions were obtained:
Fraction I: b.p. 73°–200° C 28%; viscosity = 21.0 cs at 20° C
Fraction II. b.p. 200°–284° C 50%; viscosity = 167 cs at 20° C
Residue: 20%; viscosity = 861 cs at 20° C.

The viscosity of said two fractions and of the residue at the temperatures of 100° F, 210° F, the corresponding viscosity index and the pour point were as follows:

|  | Kinematic viscosity at 100°F. (cs) | viscosity at 210°F. (cs) | Viscosity Index | Pour Point |
|---|---|---|---|---|
| fraction I | 10.3 | 2.3 | 23 | −60°C. |
| fraction II | 63.5 | 8.65 | 116 | −47°C. |
| residue | 290 | 27.13 | 131 | −29°C. |

EXAMPLE 11

According to the method of Example 9 described above, several kilograms of a copolyether containing —CF$_2$O— and —C$_2$F$_4$O— units in the ratio of 0.7:1, having the CF$_3$O— terminal groups, resulting from the transformation of the originally present terminal groups by action of fluorine at a temperature of 200°–250° C, were prepared.

This fluid was subjected to distillation under high vacuum, thus obtaining a fraction having a boiling temperature higher than 250° C at 0.1 mmHg and characterized by a viscosity of about 500 cs at 20° C.

This last product was used as means for heat transfer in a chemical apparatus (working without a break for very long periods of time) — in which a temperature of 380° C must be reached and kept without variations greater than ±2° C.

For this purpose a 20 l basin was prepared containing 30 kg of perfluoropolyether in which 10 kw electric resistances connected to an automatic thermocontrol system were immersed. The hot liquid was circulated by a pump at the flow rate of about 700 l/h through the aforementioned chemical apparatus and returned to the heating basin.

A thermostatic circuit operating at high temperature, without particular precautions to separate the hot liquid from atmospheric air, was thus obtained.

After 1,700 hours of working at the temperature of 380° C, neither evaluable losses of the fluid used due to evaporation nor thermo-oxidizing degradation nor formation of solid deposits in the pipes through which the liquid runs, nor corrosion of the metal surfaces (stainless steel, monel, nickel) in contact with the hot liquid were observed.

Analysis of the fluid showed that, at the end of the operation, the perfluorinated polyether maintained, with a variation of ±5 percent, the same viscosity values it had before its use.

EXAMPLE 12

In carrying out the fluorination of a fluorinated polyether in accordance with the present invention on a large scale, in reactors having capacities of the order of about 100 kg, several serious problems of safety and of preservation of the apparatus arise.

Generally, on this large a scale, the fluorine is supplied to the reactor under atmospheric pressure from an electrolytic generator. The fluorination reactor consists of a monel vessel having a capacity of 80 l, equipped with a monel agitator, a monel dipping tube for introducing fluorine (which may be mixed with nitrogen), an outer heating jacket, a monel outlet tube connected (1) with a condenser for the condensation of low boiling products, if any, and (2) with a cylindrical iron reactor containing molten sulfur for the combustion, prevailingly to SF$_6$, of the possible unreacted fluorine leaving the fluorination reactor.

Since the fluorine is introduced under atmospheric pressure, in order to overcome the hydrostatic pressure of the liquid phase present in the fluorination reactor, the outlet of the sulfur reactor is connected with a liquid-ring vacuum pump capable of producing a sufficient vacuum for establishing the passage of the desired rate of fluorine through the liquid being subjected to fluorination.

Three problems in particular which had to be solved in using such apparatus, involved the selection of a suitable fluid medium.

The first problem relates to measuring the amount of fluorine introduced into the reactor and the pressures in the various portions of the apparatus. For this purpose flow-meters and manometers have been used in which, as the reading liquid, which must be resistant to the action of fluorine, we selected a stable perfluoropolyether, inert to fluorine, obtained in accordance with the present invention.

The second problem relates to the heating fluid to be circulated through the heating jacket of the fluorination reactor. For this purpose it is necessary to use a fluid which is extremely resistant to the thermal and thermooxidation degradation and which, above all, is harmless in case of accidental breakages of the apparatus, in which case fluorine could contact the thermostatic fluid. For this purpose we have again found that the same perfluoropolyether fluid as that employed in Example 11 is quite suitable. Using such fluid also prevents any problems of inner corrosion, of formation of solid deposits and of variation of the characteristics of the fluid with time.

The third problem relates to the nature of the fluid to be used in the liquid-ring pump placed at the outlet of the apparatus. This liquid medium must have the following properties: substantial absence of volatility, chemical resistance to the action of extremely reactive agents (COF$_2$, CF$_3$COF, SF$_4$, HF) normally present in the effluent gas; very good lubricating power for preserving the mechanical integrity of the pump; capacity of exerting a protective action on the inner metal surfaces of the pump against the reactive chemical compounds in the effluent gas. In order to solve this problem we have used a perfluorinated polyether obtained by the process of the present invention and consisting of perfluoroalkylene units — C$_3$F$_6$— and —CF$_2$—, linked to each other through ether oxygen bonds, in the ratio of about 15:1 and containing, as chain terminals groups, only perfluoroalkoxy groups containing one to three carbon atoms.

A particularly useful perfluoropolyether was the residue after distillation carried out under 0.1 mmHg up to the temperature of 290° C of the product obtained according to the process of Example 5, which residue was characterized by a viscosity of 750 cs at 20° C.

After the use of the pump for 30 operations for a total period of 1,000 hours, no degradation on the inner metal surfaces of the pump nor of the composition of the polyether were observed.

Variations can, of course, be made without departing from the spirit and scope of the invention.

Having thus described our invention, what we desire to secure by Letters Patent and hereby claim is:

1. A perfluorinated polyether having a chain structure consisting of —CF$_2$—O— repeating units along with either or both of —C$_3$F$_6$—O— and —CF$_2$—CF$_2$—O— repeating units, wherein —C$_3$F$_6$— is a perfluoroalkylene group of the structure

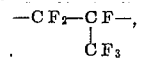

said repeating units being randomly distributed along the chain, the sum of the repeating units present along the chain being from about 2 to 200, the ratio of the total —C$_3$F$_6$—O— units to the sum of the total of —CF$_2$—O— units plus —CF$_2$—CF$_2$—O— units being from 0 to 50, the ratio of the total of —CF$_2$—CF$_2$—O— units to the total of —CF$_2$—O— units being from 0 to 10, with the proviso that when one of said ratios is zero then the other of said ratios is not zero, said polyether having terminal groups bonded to said chain through an ether oxygen bond, said terminal groups being selected from the group consisting of —CF$_3$ and —C$_2$F$_5$ when there are no —C$_3$F$_6$—O— units present, and when —C$_3$F$_6$—O— units are present, said terminal groups being the same or different from each other and selected from the group consisting of —C$_3$F$_7$, —C$_2$F$_5$, —CF$_3$ and

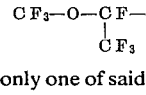

with the limitation that only one of said terminal groups can be

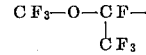

2. The product of claim 9 wherein there are no —C$_3$F$_6$—O— repeating units and the ratio of the total of —CF$_2$—CF$_2$—O— units to the total of —CF$_2$—O— units is between 0.001 and 10.

3. The product of claim 2 wherein said ratio of the total of —CF$_2$—CF$_2$—O— units to the total of —CF$_2$—O— units is between 0.2 and 5.

4. The product of claim 9 wherein there are no —CF$_2$—CF$_2$—O— repeating units and the ratio of the total of —CF$_2$—O— units to the total of —C$_3$F$_6$—O— units is between 0.02 and 1.

5. A process for the preparation of the perfluorinated polyether of claim 9 which comprises reacting fluorine, either pure or diluted with an inert gas up to a fluorine content of 10 percent by volume, under pressures between about 0.2 and 10 atmospheres and at a temperature between about 100° and 350° C with a liquid polyether having the average formula:

$$W-O-(-C_3F_6-O-)_S-(-CF_2-O-)_T-(-C_2F_4-O-)_U-(-O-)_V-Z$$

in which W and Z are terminal groups, one of said terminal groups being selected from the group consisting of $$-CF_3, \ CF_3-O-\underset{\underset{CF_3}{|}}{C}F-, \ -COF, \ -CF_2-COF, \ -\underset{\underset{CF_3}{|}}{C}F-COF,$$

$$-CF_2-CO-CF_3, \ -CF_2-C(OH)_2-CF_3, \ -CF_2H \text{ and } -\underset{\underset{CF_3}{|}}{C}FH$$

when S is different from zero, while when S is equal to zero it is selected only from the group consisting of —CF₃, —COF, —CF₂—COF and —CF₂H, and the other said terminal group being selected from the group consisting of $$-COF, \ -CF_2-COF, \ -\underset{\underset{CF_3}{|}}{C}F-COF, \ -CF_2-CO-CF_3,$$

$$-CF_2-C(OH)_2-CF_3, \ -CF_2H \text{ and } -\underset{\underset{CF_3}{|}}{C}FH$$

when the index S is different from zero, while when S is zero such other terminal group is selected only from the group consisting of —COF, —CF₂—COF and —CF₂H; (—O—) is an oxygen atom distributed randomly along the chain and bound in the peroxidic form to the perfluorooxyalkylene units; S, T, U and V are average composition indices, of which S, U and V can be equal to zero, with the proviso that when one of said indices S and U is zero the other of said indices is not zero, the sum of S+T+U has a value between about 2 and 200, the ratio S/T+U is between about zero and 50, the ratio U/T is between about zero and 10, and the ratio V/S+T+U+1 is between about zero and 0.1.

6. The process of claim 5 wherein the reaction is carried out at a temperature between about 120° and 320° C under about atmospheric pressure.

7. The process of claim 5 wherein said inert gas is selected from the group consisting of nitrogen, helium and argon.

8. The process of claim 6 wherein said inert gas is selected from the group consisting of nitrogen, helium and argon.

* * * * *